(12) United States Patent
Zhu et al.

(10) Patent No.: US 10,616,844 B2
(45) Date of Patent: Apr. 7, 2020

(54) SYSTEMS AND METHODS FOR OPERATION OF WIRELESS USER DEVICES WITH CELLULAR AND WI-FI INTERFACES

(71) Applicant: Huawei Technologies Co., Ltd., Shenzhen (CN)

(72) Inventors: Peiying Zhu, Kanata (CA); Osama Aboul-Magd, Kanata (CA); Jung Hoon Suh, Kanata (CA); Kwok Shum Au, Shenzhen (CN); Sheng Sun, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 547 days.

(21) Appl. No.: 14/279,038

(22) Filed: May 15, 2014

(65) Prior Publication Data
US 2014/0341129 A1    Nov. 20, 2014

Related U.S. Application Data

(60) Provisional application No. 61/823,732, filed on May 15, 2013.

(51) Int. Cl.
*H04W 56/00*  (2009.01)
*H04W 72/12*  (2009.01)
(Continued)

(52) U.S. Cl.
CPC ........... *H04W 56/0015* (2013.01); *H04L 5/00* (2013.01); *H04W 28/0289* (2013.01);
(Continued)

(58) Field of Classification Search
None
See application file for complete search history.

(56) References Cited

U.S. PATENT DOCUMENTS

2008/0014884 A1*  1/2008  Oyman ............... H04B 7/0452
                                                                        455/187.1
2008/0219286 A1*  9/2008  Ji ......................... H04L 12/413
                                                                        370/445
(Continued)

FOREIGN PATENT DOCUMENTS

CN          101490976 A      7/2009
CN          101772983 A      7/2010
(Continued)

OTHER PUBLICATIONS

"ETSI Technical Specification LTE; Evolved Universal Terrestrial Radio Access (E-UTRA); Physical channels and modulation (3GPP TS 36.211 version 11.2.0 Release 11)," ETSI TS 136 211 v11.2.0 (Apr. 2013), 111 pages.

(Continued)

*Primary Examiner* — Adnan Baig
(74) *Attorney, Agent, or Firm* — Slater Matsil, LLP

(57) ABSTRACT

An embodiment method for wireless communication includes grouping a plurality of user equipments (UEs) wirelessly coupled to a cellular base station (BS) into a UE cluster to function as a Wi-Fi virtual station (V-STA), and communicating with an access point (AP) to contend for a Wi-Fi transmission opportunity (TXOP) for the V-STA. In a further embodiment, the cellular BS contends for the TXOP on behalf of the UE cluster using a carrier sense multiple access with collision avoidance (CSMA-CA) procedure. In an alternative embodiment, one UE in the UE cluster is selected as a leader UE to contend for the TXOP on behalf of the UE cluster using a CSMA-CA procedure.

24 Claims, 3 Drawing Sheets

(51) Int. Cl.
- H04L 5/00 (2006.01)
- H04W 28/02 (2009.01)
- H04W 40/32 (2009.01)
- H04W 74/08 (2009.01)
- H04W 88/06 (2009.01)
- H04W 72/04 (2009.01)
- H04W 76/15 (2018.01)

(52) U.S. Cl.
CPC ........... *H04W 72/12* (2013.01); *H04L 5/0007* (2013.01); *H04W 40/32* (2013.01); *H04W 72/04* (2013.01); *H04W 74/0816* (2013.01); *H04W 76/15* (2018.02); *H04W 88/06* (2013.01)

(56) References Cited

U.S. PATENT DOCUMENTS

| | | | |
|---|---|---|---|
| 2008/0310405 A1 | 12/2008 | Cox et al. | |
| 2009/0034432 A1* | 2/2009 | Bonta | H04W 74/02 370/255 |
| 2010/0027487 A1* | 2/2010 | Ihm | H04B 7/022 370/329 |
| 2011/0134816 A1* | 6/2011 | Liu | H04L 1/06 370/310 |
| 2011/0293838 A1 | 12/2011 | Warichet et al. | |
| 2012/0127935 A1* | 5/2012 | Josiam | H04W 72/121 370/329 |
| 2012/0231828 A1* | 9/2012 | Wang | H04W 74/06 455/509 |
| 2014/0009873 A1 | 1/2014 | Nashner et al. | |
| 2014/0098731 A1 | 4/2014 | Maaref et al. | |
| 2014/0313949 A1* | 10/2014 | Lilleberg | H04W 28/065 370/280 |

FOREIGN PATENT DOCUMENTS

| | | |
|---|---|---|
| CN | 102282285 A | 12/2011 |
| WO | 2012139278 A1 | 10/2012 |
| WO | 2012159270 A1 | 11/2012 |
| WO | WO 2012159270 A1 * | 11/2012 .......... H04W 72/048 |
| WO | 2013013409 A1 | 1/2013 |

OTHER PUBLICATIONS

"ETSI Technical Specification LTE; Evolved Universal Terrestrial Radio Access (E-UTRA); Multiplexing and channel coding (3GPP TS 36.212 version 11.2.0 Release 11)," ETSI TS 136 212 v11.2.0 (Apr. 2013), 84 pages.

"ETSI Technical Specification LTE; Evolved Universal Terrestrial Radio Access (E-UTRA); Physical layer procedures (3GPP TS 36.213 version 11.2.0 Release 11)," ETSI TS 136 213 v11.2.0 (Apr. 2013), 175 pages.

IEEE Computer Society, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Standards Association, IEEE Std 802.11-2012 (Revision of IEEE Std 802.11-2007), Mar. 29, 2012, 2793 pages.

International Search Report and Written Opinion received in Application No. PCT/US2014/038243 dated Dec. 10, 2014, 13 pages.

* cited by examiner

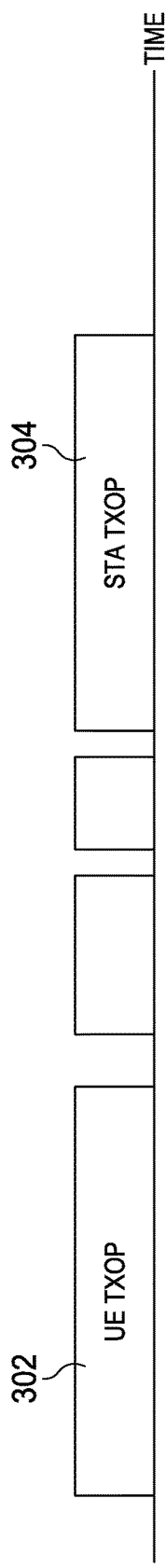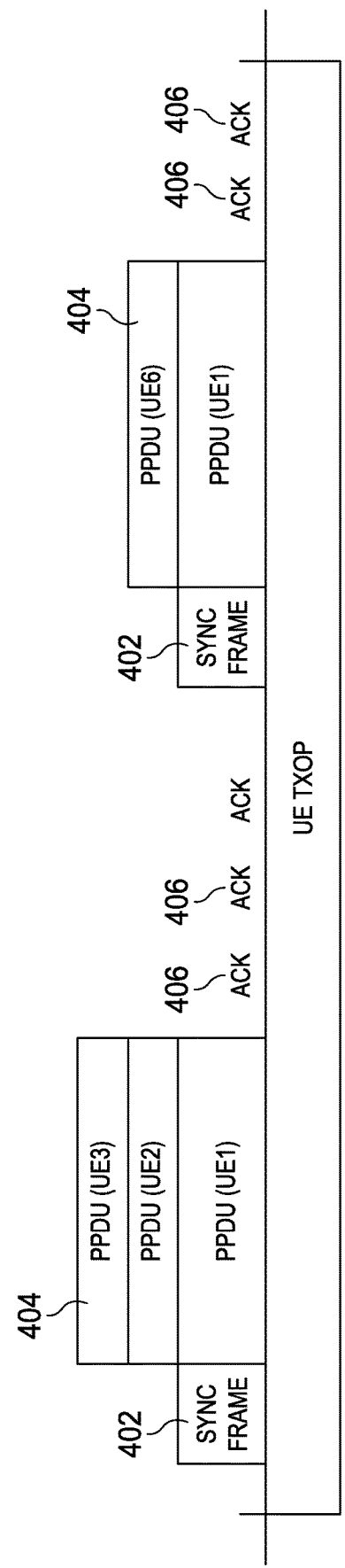

SYSTEMS AND METHODS FOR OPERATION OF WIRELESS USER DEVICES WITH CELLULAR AND WI-FI INTERFACES

This application claims the benefit of U.S. Provisional Application No. 61/823,732, filed on May 15, 2013, which application is hereby incorporated herein by reference.

TECHNICAL FIELD

The present invention relates to systems and methods for wireless communications, and, in particular embodiments, to systems and methods for operation of wireless user devices with cellular and Wi-Fi interfaces.

BACKGROUND

Many wireless smart devices such as smart phones and tablets are equipped with multiple interfaces to allow access to wireless networks based on cellular technologies such as LTE and to other wireless networks based on Wi-Fi technology, as shown in FIG. 1.

FIG. 1 is a logical diagram showing a cellular base station (BS) 102 and a Wi-Fi access point (AP) 104 as two separate physical entities. In practice these two network entities can be co-located. Cellular networks operate in licensed bands where operation is limited to a single operator network and no sharing with other devices is allowed. Operation in licensed bands enables cellular networks to support elaborate resource sharing mechanisms and precise synchronization. Resource allocation and synchronization information usually are transmitted from the BS 102 to user equipments (UEs) 106 using dedicated control channels.

On the other hand Wi-Fi networks operate in unlicensed bands where interference from other (non-Wi-Fi) devices is common. Consequently, transmission opportunities (TX-OPs) for stations (STAs) 108 are allocated on a random basis using carrier sense multiple access with collision avoidance (CSMA/CA). Uplink (UL) and downlink (DL) transmission periods are not scheduled. This is in contrast to cellular networks, where UL and DL are scheduled and the schedule is kept at all participating network devices.

SUMMARY OF THE INVENTION

An embodiment method for wireless communication includes grouping a plurality of user equipments (UEs) wirelessly coupled to a cellular base station (BS) into a UE cluster to function as a Wi-Fi virtual station (V-STA), and communicating with an access point (AP) to contend for a Wi-Fi transmission opportunity (TXOP) for the V-STA. In a further embodiment, the cellular BS contends for the TXOP on behalf of the UE cluster using a carrier sense multiple access with collision avoidance (CSMA-CA) procedure. In an alternative embodiment, one UE in the UE cluster is selected as a leader UE to contend for the TXOP on behalf of the UE cluster using a CSMA-CA procedure.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates Wi-Fi transmission opportunities;
FIG. 4 illustrates a transmission format using UL MU-MIMO.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

While the operation of CSMA/CA in a Wi-Fi network affects the achieved network throughput negatively (the media access control (MAC) efficiency using CSMA/CA usually doesn't exceed 50%), CSMA/CA has an advantage in allowing unsynchronized access to the wireless medium in both the UL and DL directions.

An embodiment takes into account the case where the cellular base station and the Wi-Fi AP are collocated in a single physical entity that enables better management of resources by the service provider. Cellular as well as Wi-Fi resources, including radio resources, are allocated so as to improve overall user performance and experience.

In a dual radio system, an embodiment provides a mechanism to enable synchronous transmission and, at the same time, to maintain the unlicensed spectrum sharing mechanism.

Figure 1:
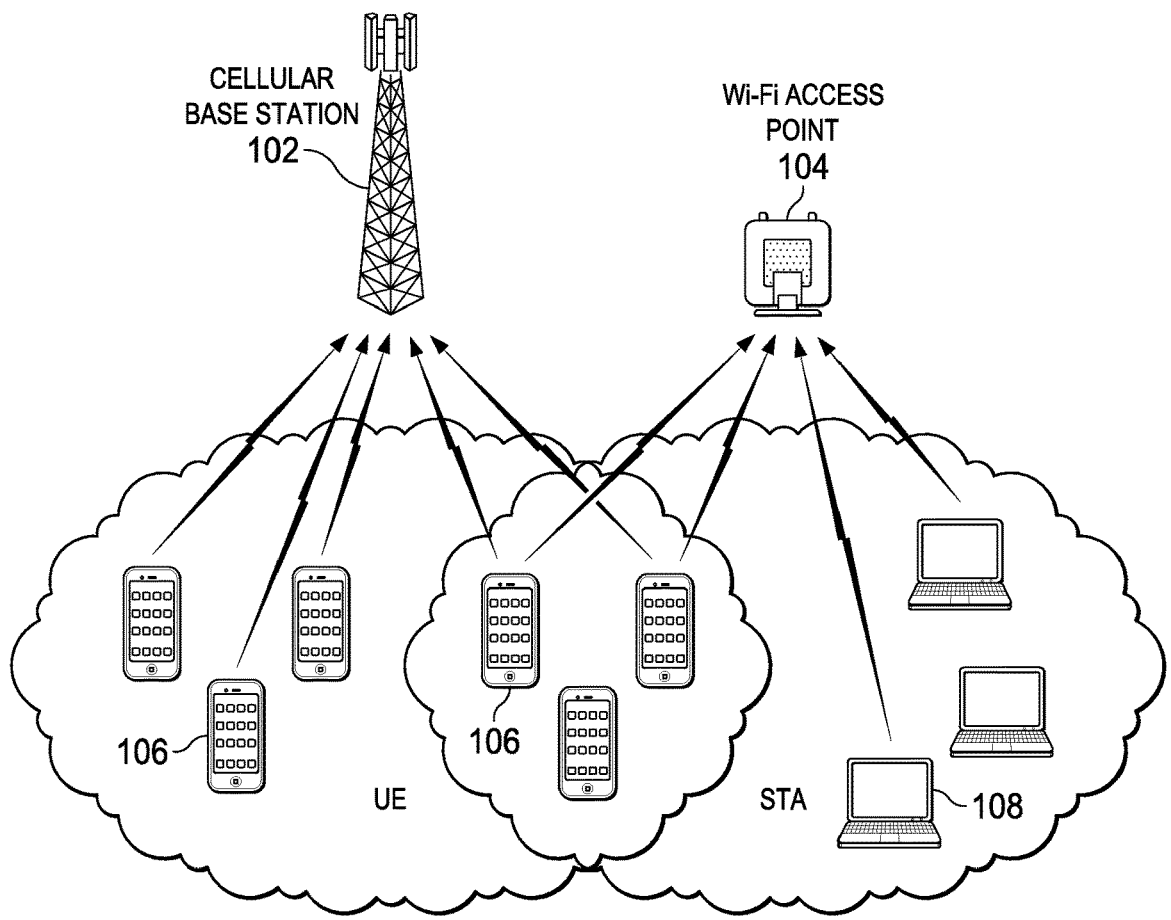
FIG. 1 illustrates cellular and Wi-Fi networks.

An embodiment provides a mechanism for a cluster of cellular UEs, equipped with cellular and Wi-Fi interfaces as shown in FIG. 1, to acquire a Wi-Fi transmission opportunity. During the acquired opportunity, the UE cluster arranges its DL and UL transmissions based on some transmission format, including orthogonal frequency division multiple access (OFDMA).

An embodiment uses Wi-Fi infrastructure to enhance cellular performance. An embodiment introduces a UE cluster as a virtual single entity competing for Wi-Fi resources. An embodiment introduces a UE TXOP, during which resources are assigned to members of the cluster. Embodiments provide various transmission formats for use during the UE TXOP. An embodiment uses licensed bands for control and Wi-Fi bands for data. The Wi-Fi resources are used to enhance cellular network performance irrespective of the congestion conditions of the cellular network. Embodiments may be implemented in cellular and Wi-Fi networks and devices, such as base stations, access points, user equipments, stations, and the like.

Figure 2:
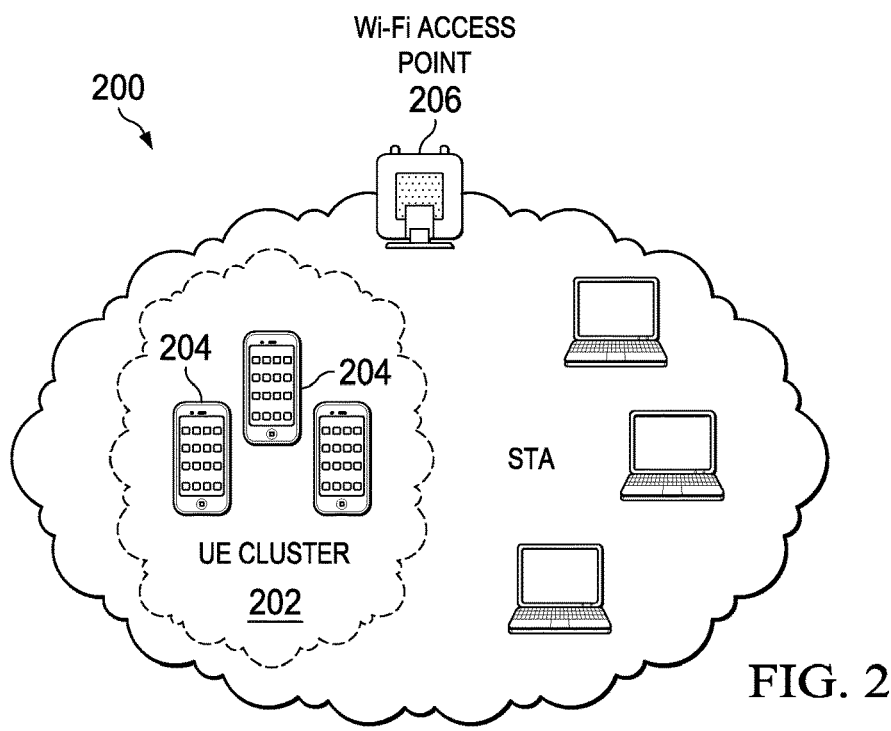
FIG. 2 illustrates a UE cluster.

FIG. 2 shows a UE cluster 202 in a wireless system 200. A number of cellular UEs 204 are attempting to utilize service offered by the Wi-Fi network 206 to achieve a specific goal. This goal may include cellular off-loading to avoid cellular network congestion or improve cellular network efficiency by allowing the UEs 204 to use Wi-Fi facilities for device-to-device (D2D) communication.

Because cellular UEs are controlled by the cellular BS, the formation of the UE cluster is the responsibility of the BS and may be preconfigured. The criteria for forming a cluster may include geographical vicinity, availability of specific features, etc.

The UE cluster is presented to the Wi-Fi network 206 as a virtual station (V-STA). The V-STA competes for the Wi-Fi resources behaving like any other Wi-Fi STA, e.g., performing CSMA/CA and the related back-off procedure. Several methods may be used for allowing a V-STA to contend for the medium.

As one example, members of the V-STA may select a UE to contend for the medium on behalf of the cluster. The selected UE is then the leader UE and its identity may change from one transmission opportunity to the other based on the UE mobility profile.

As another example, the cellular BS may contend for the medium on behalf of the cluster. In this solution the BS architecture includes a module that allows association with the Wi-Fi AP and performance of the CSMA/CA procedure. Access to the medium and synchronization information can then be communicated to the cluster UE using the cellular control channel.

The V-STA contending with other Wi-Fi STAs eventually gains access to the medium and acquires a transmission opportunity of a specific duration. FIG. 3 shows typical channel occupancy as a function of the time.

FIG. 3 shows the alternation of transmission opportunities (TXOPs) between UE cluster and Wi-Fi STA. During the UE TXOP 302, other devices are silenced (i.e., are not allowed to transmit to the medium) by deferring their transmissions for the duration of the TXOP in order not to interfere with the UE cluster transmissions.

Forcing a group of stations to defer their transmissions until a STA TXOP 304 may be accomplished using physical (PHY) or the MAC headers. Spoofing of legacy STAs using the PHY header is commonly used to force legacy STAs to remain silent for a period of time. For other STAs the use of MAC frames such as Request to Send (RTS) and Clear to Send (CTS) are typically used to set the network allocation vector (NAV) and force STAs to remain silent for a given duration of time. Both methods are described in "Wireless LAN Medium Access Control (MAC) and Physical Layer (PHY) Specifications," IEEE 802.11, March 2012, which is hereby incorporated herein by reference.

In an embodiment, members of the UE cluster ignore the silencing request at the PHY or MAC layers and stay in the active state to participate in the pending transmissions. This objective can be achieved by the introduction of a new MAC frame that includes the identity of the UE groups for which the TXOP is acquired. The same frame can be used to set the NAV for other STAs including those UEs that are not members of the group. This new frame may be transmitted by the V-STA at the start of the UE TXOP. The relevant identifier may be included in the PHY header in the same way the multi-user multiple-input multiple-output (MU-MIMO) Group Identifier is included in the PHY preamble. The identifier matches the UE cluster identifier that may be set by the BS.

During the TXOP transmissions from multiple UEs, using the Wi-Fi spectrum is encouraged to make efficient use of the available resources. Several transmission formats may be possible.

First, allow member UEs to contend for the medium in the same way as in a regular Wi-Fi network using CSMA/CA. The transmission format then uses the OFDM-based Wi-Fi frame format. This method, however, would not achieve the best desired throughput improvement because it suffers from Wi-Fi contention and frame overhead.

Second, use a scheduled mechanism where member UEs transmit/receive at pre-specified times during the UE TXOP. The transmission format then uses the OFDM-based Wi-Fi frame format.

Third, all member UEs use MU-MIMO, both in the UL and in the DL. DL MU-MIMO is supported in IEEE 802.11ac and its use should be supported. FIG. 4 shows the transmission format using UL MU-MIMO. UL MU-MIMO allows member UEs or a subset of them to simultaneously transmit Physical Layer Convergence Procedure (PLCP) Protocol Data Units (PPDUs) 404 in the UL direction. At the start of a UL transmission, the AP transmits a sync frame 402 to indicate those UEs participating in the current UL transmission and synchronizes them. ACKs 406 are sent by the AP to indicate successful transmissions and are sent in sequence or possibly using DL MU-MIMO.

Fourth, use OFDMA for UL and DL transmissions. For example the use of OFDMA may follow the same format defined for DL transmissions in LTE, where resource blocks are allocated to different UEs by either the AP or the BS. The format for DL transmissions is defined in TS 36.211 Evolved Universal Terrestrial Radio Access (E-UTRA), Physical Channel and Modulation, TS 36.212 Evolved Universal Terrestrial Radio Access (E-UTRA): Multiplexing and Channel Coding, and TS 36.213 Evolved Universal Terrestrial Radio Access (E-UTRA), Physical Layer Procedures, all of which references are hereby incorporated herein by reference. The LTE transmission format is not backward compatible and cannot be interpreted by some of the Wi-Fi devices, e.g., devices based on 802.11n or 802.11ac. As was previously suggested, a new frame that is backward compatible with legacy stations can be used at the start of the UE TXOP to set the NAV function at these stations to the desired value.

Figure 5:
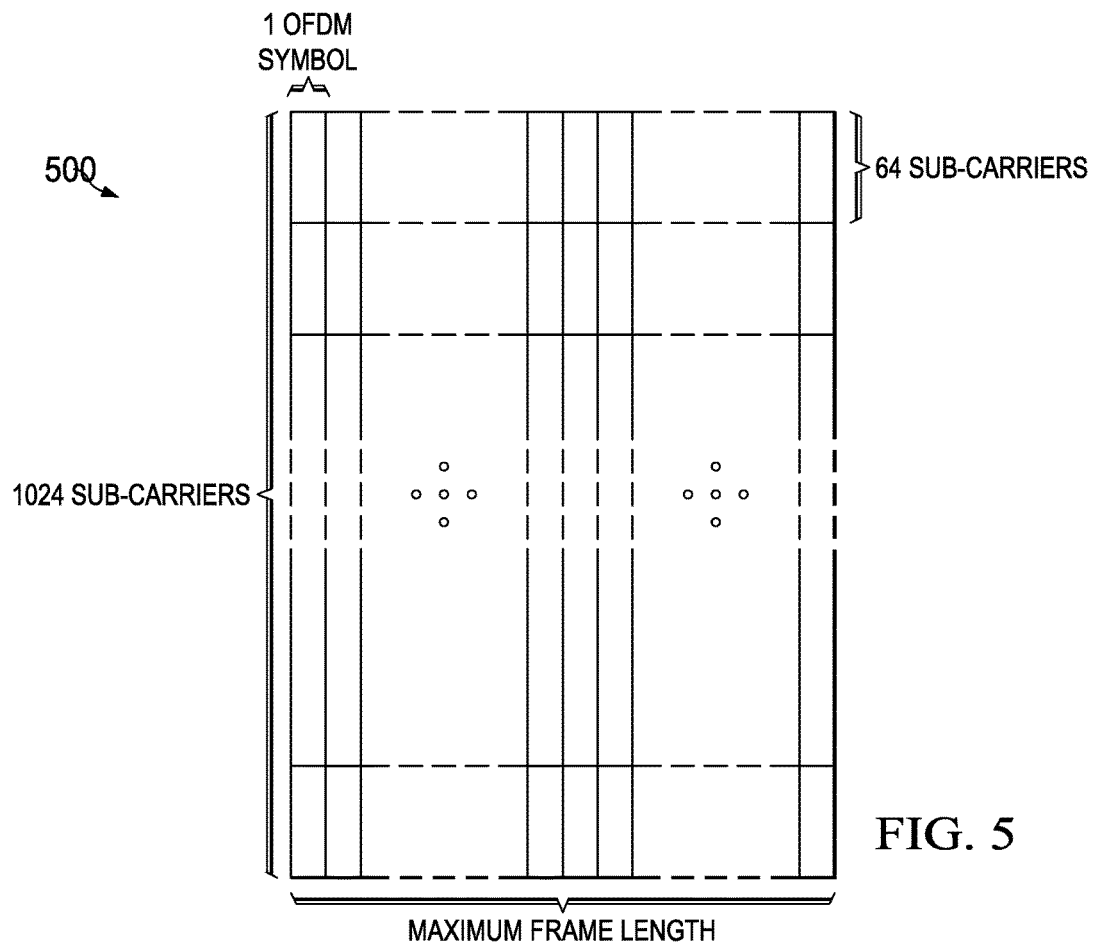
FIG. 5 illustrates a transmission format.

Fifth, a transmission format 500 of the form shown in FIG. 5 can be used for both UL and DL transmissions. The format of FIG. 5 can be thought of as midway between a pure LTE-OFDMA format and a pure IEEE 802.11-OFDM format. It divides the available spectrum into a number of 20 MHz (other segmentation is also possible) channels or segments, and allocates a number of segments to each user. FIG. 5 shows an example where 20 MHz channels and 64 sub-carriers are allocated for each UE.

Unlike LTE-OFDMA, the length of the frame in FIG. 5 is not limited by time. Instead a maximum frame length is propagated to members of the UE cluster at the beginning of the UE TXOP. The maximum frame length may be configured to be dynamically adjusted by the AP for each UE TXOP. UEs use padding whenever necessary to have their frames aligned at the maximum frame length. As many OFDM symbols as needed are used to encode the MAC frame up to the maximum frame length.

While transmission bandwidth maybe wasted due to the max frame length, the format shown in FIG. 5 is backward compatible, where the first few OFDM symbol of every frame may be used to spoof legacy stations by adding the legacy preamble at the start of the PPDU.

The same transmission format may be used for both the UL and DL directions. In both cases the AP or the BS synchronizes members of the UE cluster before the start of the transmission. A MU-MIMO may be applied per each component carrier on top of the transmission format shown in FIG. 5.

Figure 6:
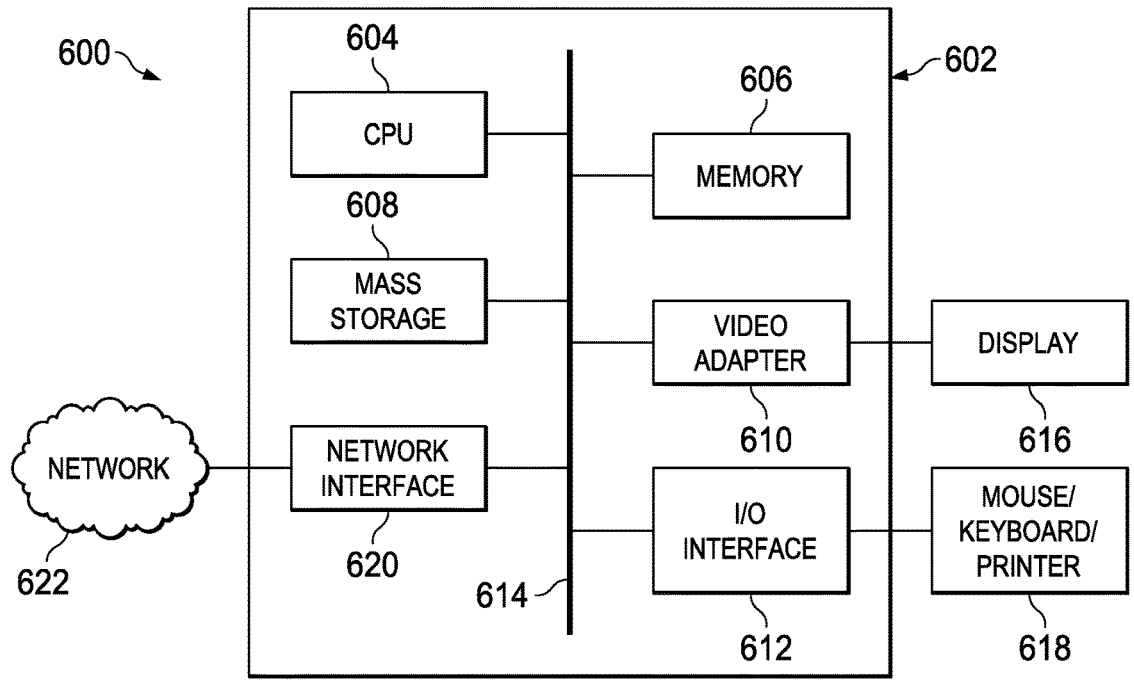
FIG. 6 illustrates a computing platform that may be used for implementing, for example, the devices and methods described herein, in accordance with an embodiment.

FIG. 6 is a block diagram of a processing system 600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 602 equipped with one or more input/output devices, such as a speaker, microphone, mouse, touchscreen, keypad, keyboard, printer, display, and the like. The processing unit 602 may include a central processing unit (CPU) 604, memory 606, a mass storage device 608, a video adapter 610, and an I/O interface 612 connected to a bus 614.

The bus 614 may be one or more of any type of several bus architectures including a memory bus or memory controller, a peripheral bus, video bus, or the like. The CPU 604 may comprise any type of electronic data processor. The memory 606 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 608 may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter 610 and the I/O interface 612 provide interfaces to couple external input and output devices to the processing unit. As illustrated, examples of input and output devices include the display 616 coupled to the video adapter and the mouse/keyboard/printer 618 coupled to the I/O interface. Other devices may be coupled to the processing unit, and additional fewer interface cards may be utilized. For example, a serial interface such as Universal Serial Bus (USB) (not shown) may be used to provide an interface for a printer.

The processing unit 602 also includes one or more network interfaces 620, which may comprise wired links, such as an Ethernet cable or the like, and/or wireless links to access nodes or different networks 622. The network interface 620 allows the processing unit to communicate with remote units via the networks. For example, the network interface 620 may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communications by a first user equipment (UE) having a cellular air interface and a wireless-fidelity (Wi-Fi) air interface, the method comprising:
receiving, by the first UE, a cellular message from a base station (BS) instructing the first UE to be a member of a UE cluster with at least one other UE;
contending for and acquiring, by the first UE as a member of and on behalf of the UE cluster, a Wi-Fi transmission opportunity (TXOP) for the UE cluster;
scheduling, by the first UE as a member of the UE cluster, during the Wi-Fi TXOP, individual downlink and uplink transmissions for each UE in the UE cluster; and
transmitting, by the first UE, data to an access point (AP) outside the UE cluster, in accordance with cellular timing information and the scheduling, the transmitting by the first UE occurring synchronously with an uplink transmission by each UE in the UE cluster scheduled in the Wi-Fi TXOP.

2. The method of claim 1, wherein the first UE is selected as a leader of the UE cluster.

3. The method of claim 2, wherein the first UE contends for the Wi-Fi TXOP using a carrier sense multiple access with collision avoidance (CSMA-CA) procedure.

4. The method of claim 1, wherein coordination of the UE cluster within the Wi-Fi TXOP is performed via a licensed cellular control channel.

5. The method of claim 1, wherein a transmission mechanism in the Wi-Fi TXOP is selected from the group consisting of orthogonal frequency division multiple access (OFDMA), single-carrier FDMA (SC-FDMA), and scheduled multiple access.

6. The method of claim 1, further comprising:
receiving, by the first UE, a maximum frame length from the AP; and
in response to a length of a frame transmitted by the first UE in the Wi-Fi TXOP being shorter than the maximum frame length, padding the frame to align the frame with the maximum frame length.

7. The method of claim 1, wherein transmitting the data further comprises using, by the first UE, multi-user multiple-input multiple-output (MU-MIMO) in coordination with other UEs in the UE cluster.

8. A method for wireless communication comprising:
grouping, by a cellular base station (BS), a plurality of user equipments (UEs) into a UE cluster for communication with an access point (AP) as a Wi-Fi virtual station (V-STA);
transmitting, by the cellular BS, a cellular message to the plurality of UEs instructing the plurality of UEs to be members of the UE cluster;
coordinating, by the cellular BS, each individual UE in the UE cluster within a Wi-Fi transmission opportunity (TXOP) via a licensed cellular control channel;
contending for and acquiring, by the cellular BS, the Wi-Fi TXOP on behalf of the UE cluster using a carrier sense multiple access with collision avoidance (CSMA-CA) procedure; and
receiving, by the cellular BS, data in an uplink transmission scheduled in the Wi-Fi TXOP synchronously from each individual UE in the UE cluster.

9. The method of claim 8, wherein the cellular BS is a leader of the UE cluster.

10. The method of claim 8, wherein the cellular BS has AP functionality.

11. The method of claim 8, further comprising scheduling, by the cellular BS, the plurality of UEs for transmission/reception in the Wi-Fi TXOP.

12. The method of claim 8, further comprising allocating a number of sub-carriers to each UE in the UE cluster for transmission/reception in the Wi-Fi TXOP.

13. A first user equipment (UE) comprising:
a cellular air interface;
a wireless-fidelity (Wi-Fi) air interface;
a processor; and a non-transitory computer readable storage medium storing programming for execution by the processor, the programming including instructions to:
  receive a cellular message from a base station (BS) instructing the first UE to be a member of a UE cluster with at least one other UE;
  contend for and acquire, by the first UE as a member of and on behalf of the UE cluster, a Wi-Fi transmission opportunity (TXOP) for the UE cluster;
  schedule, by the first UE as a member of the UE cluster, during the Wi-Fi TXOP, individual downlink and uplink transmissions for each UE in the UE cluster; and
  transmit data to an access point (AP) outside the UE cluster synchronously with an individual uplink transmission by each UE in the UE cluster scheduled in the Wi-Fi TXOP, in accordance with cellular timing information and the scheduling.

14. A cellular base station (BS) comprising:
a processor; and
a non-transitory computer readable storage medium storing programming for execution by the processor, the programming including instructions to:
  group a plurality of user equipments (UEs) into a UE cluster for communication with an access point (AP) as a Wi-Fi virtual station (V-STA);
  transmit a cellular message to the plurality of UEs instructing the plurality of UEs to be members of the UE cluster;
  coordinating each individual UE in the UE cluster within a Wi-Fi transmission opportunity (TXOP) via a licensed cellular control channel;
  contend for and acquire the Wi-Fi TXOP on behalf of the UE cluster using a carrier sense multiple access with collision avoidance (CSMA-CA) procedure; and
  receive data in an uplink transmission scheduled in the Wi-Fi TXOP synchronously from each individual UE in the UE cluster.

15. The first UE of claim 13, wherein the first UE is selected as a leader of the UE cluster.

16. The first UE of claim 15, wherein the programming further includes instructions to contend for the Wi-Fi TXOP using a carrier sense multiple access with collision avoidance (CSMA-CA) procedure.

17. The first UE of claim 13, wherein coordination of the UE cluster within the Wi-Fi TXOP is performed via a licensed cellular control channel.

18. The first UE of claim 13, wherein a transmission mechanism in the Wi-Fi TXOP is selected from the group consisting of orthogonal frequency division multiple access (OFDMA), single-carrier FDMA (SC-FDMA), and scheduled multiple access.

19. The first UE of claim 13, wherein the programming further includes instructions to:
  receive a maximum frame length from the AP; and
  in response to a length of a frame transmitted by the first UE in the Wi-Fi TXOP being shorter than the maximum frame length, pad the frame to align the frame with the maximum frame length.

20. The first UE of claim 13, wherein the instructions to transmit the data comprise instructions to use multi-user multiple-input multiple-output (MU-MIMO) in coordination with other UEs in the UE cluster.

21. The cellular BS of claim 14, wherein the cellular BS is a leader of the UE cluster.

22. The cellular BS of claim 21, wherein the cellular BS has AP functionality.

23. The cellular BS of claim 14, wherein the programming further includes instructions to schedule the plurality of UEs for transmission/reception in the Wi-Fi TXOP.

24. The cellular BS of claim 14, wherein the programming further includes instructions to allocate a number of subcarriers to each UE in the UE cluster for transmission/reception in the Wi-Fi TXOP.

* * * * *